(12) United States Patent
Wang

(10) Patent No.: US 9,578,215 B2
(45) Date of Patent: Feb. 21, 2017

(54) EVENT DATA RECORDER

(71) Applicant: Tsung-Ming Wang, Chiayi (TW)

(72) Inventor: Tsung-Ming Wang, Chiayi (TW)

(*) Notice: Subject to any disclaimer, the term of this patent is extended or adjusted under 35 U.S.C. 154(b) by 213 days.

(21) Appl. No.: 14/619,040

(22) Filed: Feb. 10, 2015

(65) Prior Publication Data

US 2016/0234407 A1  Aug. 11, 2016

(51) Int. Cl.
| | |
|---|---|
| *H04N 5/00* | (2011.01) |
| *H04N 5/225* | (2006.01) |
| *G02B 5/10* | (2006.01) |
| *G02B 7/182* | (2006.01) |
| *B60R 1/00* | (2006.01) |
| *B60R 11/04* | (2006.01) |
| *B60R 11/00* | (2006.01) |

(52) U.S. Cl.
CPC ............. *H04N 5/2252* (2013.01); *B60R 1/00* (2013.01); *B60R 11/04* (2013.01); *G02B 5/10* (2013.01); *G02B 7/1822* (2013.01); *B60R 2011/0026* (2013.01); *B60R 2011/0056* (2013.01)

(58) Field of Classification Search
CPC ......... H04N 5/2253; B60R 1/00; B60R 11/04; G02B 5/10
USPC ......................................... 348/148
See application file for complete search history.

(56) References Cited

U.S. PATENT DOCUMENTS

2006/0132600 A1* 6/2006 Chretien .................. B60R 1/00
                                                    348/148

* cited by examiner

*Primary Examiner* — Jeffery Williams
(74) *Attorney, Agent, or Firm* — Leong C. Lei

(57) ABSTRACT

The event data recorder contains a mirror set and a camera member. The mirror set contains two curved mirrors, each for capturing an outside view to a lateral side of a vehicle. The camera member contains a camera facing towards the windshield of the vehicle and the curved mirrors. As such, the camera is able to capture views in front of the vehicle and reflected from the curved mirrors simultaneously.

6 Claims, 5 Drawing Sheets

EVENT DATA RECORDER

BACKGROUND OF THE INVENTION (a) Technical Field of the Invention

The present invention is generally related to event data recording, and more particular to an event data recorder capable of recording video from a front side and two lateral sides of a vehicle with a single camera.

(b) Description of the Prior Art

Recently most vehicles have an event data recorder installed inside. For example, as shown in FIG. 5, a conventional event data recorder 30 according to R.O.C. Taiwan Patent No. M415078 contains a front camera 31 and a rear camera 32. The front camera 31 is configured in a tubular body in front of the event data recorder 30 that can be rotated to adjust the front camera 31's angle. A screen 33 can be flipped down from a bottom side of the event data recorder 30, where the front and rear images captured by the front and rear cameras 31 and 32 are presented in a split-screen manner.

The above-describe event data recorder uses two cameras so as to cover events in front of and behind a vehicle. However, to cover what happens to the lateral sides of the vehicle, usually at least a separate recorder is required.

SUMMARY OF THE INVENTION

A novel event recorder is provided herein which contains a mirror set and a camera member. The mirror set contains a first fixation element, a first connection element, two mirror bases, and two curved mirrors. The first fixation element is configured to an end of the first connection element, each mirror base is configured to a second end of the first connection element oppositely to the first end, and each curved mirror is mounted on a mirror base, bulging away from the mirror base, for capturing an outside view to a lateral side of the vehicle. The camera member contains a second fixation element, a second connection element, and a camera where the second fixation element is configured to a first end of the second connection element and the camera is configured to a second end of the second connection element oppositely to the first end of the second connection element for capturing views in front of the vehicle and reflected from the curved mirrors.

The first connection element is Y-shaped.

The first fixation element is one of a suction cup, an adhesive base, and a clamp.

The second fixation element is one of a suction cup, an adhesive base, and a clamp.

The first fixation element is rotatably joined to the first connection element through a first ball joint.

Each mirror base is rotatably joined to the first connection element through a second ball joint.

As such, the event data recorder is capable of recording video from a front side and two lateral sides of a vehicle with a single camera.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
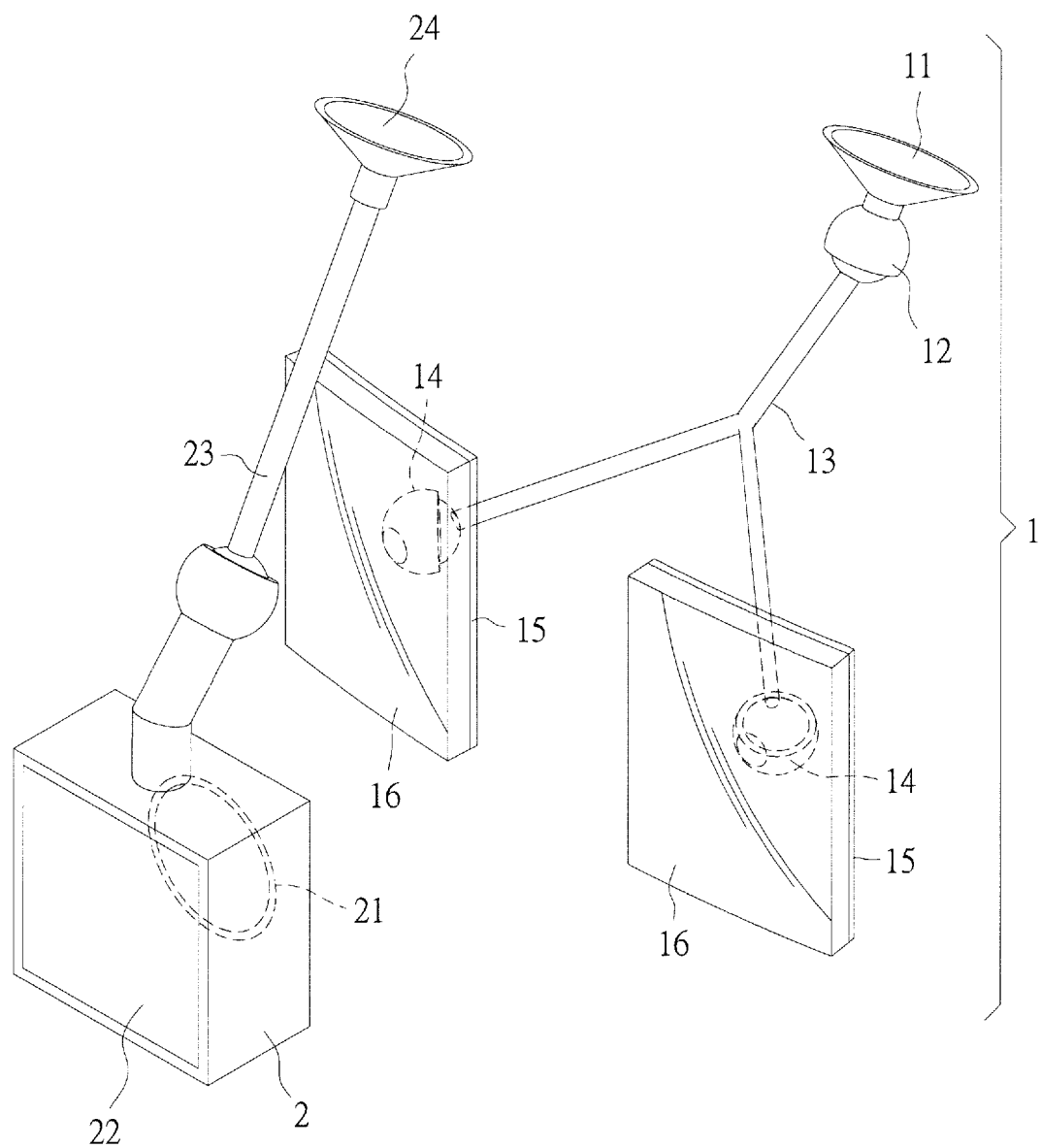
FIG. 1 is a perspective diagram showing an event data recorder according to an embodiment of the present invention.
Figure 2:
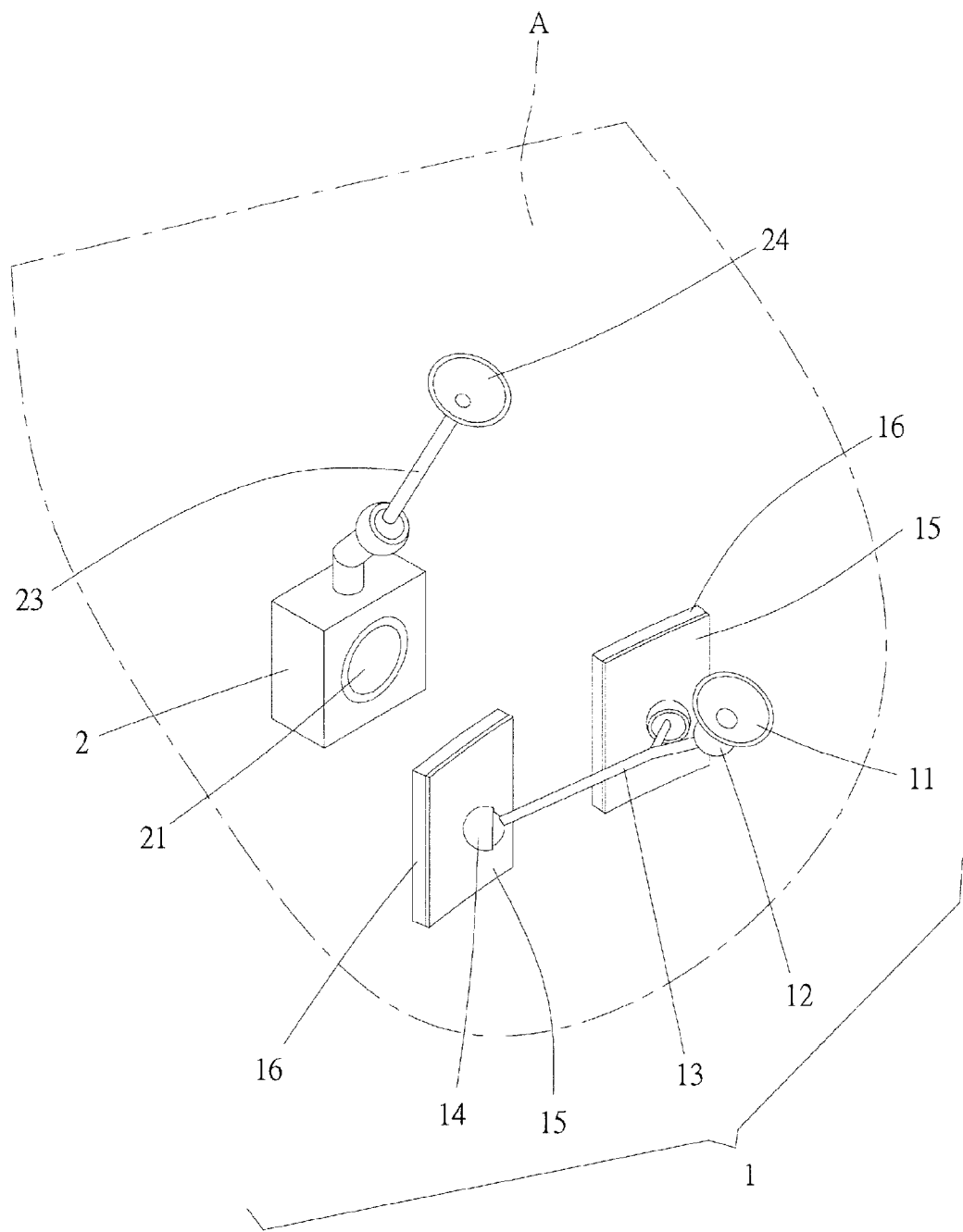
FIG. 2 is a perspective schematic diagram showing the event data recorder of FIG. 1 installed inside a vehicle.

As shown in FIGS. 1 and 2, an event data recorder according to an embodiment of the present invention contains a mirror set 1 and a camera member 2.

The mirror set 1 contains a first fixation element 11 that can be a suction cup for attaching to the inside of a vehicle's front windshield, an adhesive base for adhering on the vehicle's dashboard, or a clamp for fixing on the vehicle's rear view mirror stem. In the present embodiment, the first fixation element 11 is a suction cup. The mirror set 1 further contains a Y-shaped first connection element 13 and two mirror bases 15. The first connection element 13 has its body connected to the first fixation element 11 through a first ball joint 12, and each of its two arms connected to the two mirror bases 15 through a second ball joint 14. Each mirror base 15 supports a curved mirror 16 bulging away from the mirror base 15 for providing outside view to a lateral side of the vehicle.

The camera member 2 contains a camera 21 positioned oppositely to the mirror set 1 so that the camera 21 faces the front windshield A and the two mirrors 16, and the reflected lateral views by the mirrors 16 are captured and recorded by the camera 21. The camera member 2 also contains a linear second connection element 23 having a first end connected to a second fixation element 24 and a second end connected to the camera 21 through a third ball joint (numbered). The second fixation element 24, similar to the first fixation element 11 can be a suction cup, an adhesive base, or a clamp for attaching to the front windshield, adhering on the dashboard, or fixing on the rear view mirror stem of the vehicle, respectively. In the present embodiment, the second fixation element 24 is a suction cup. The camera member 2 further contains a screen 22 presenting images captured by the camera 21.

Figure 3:
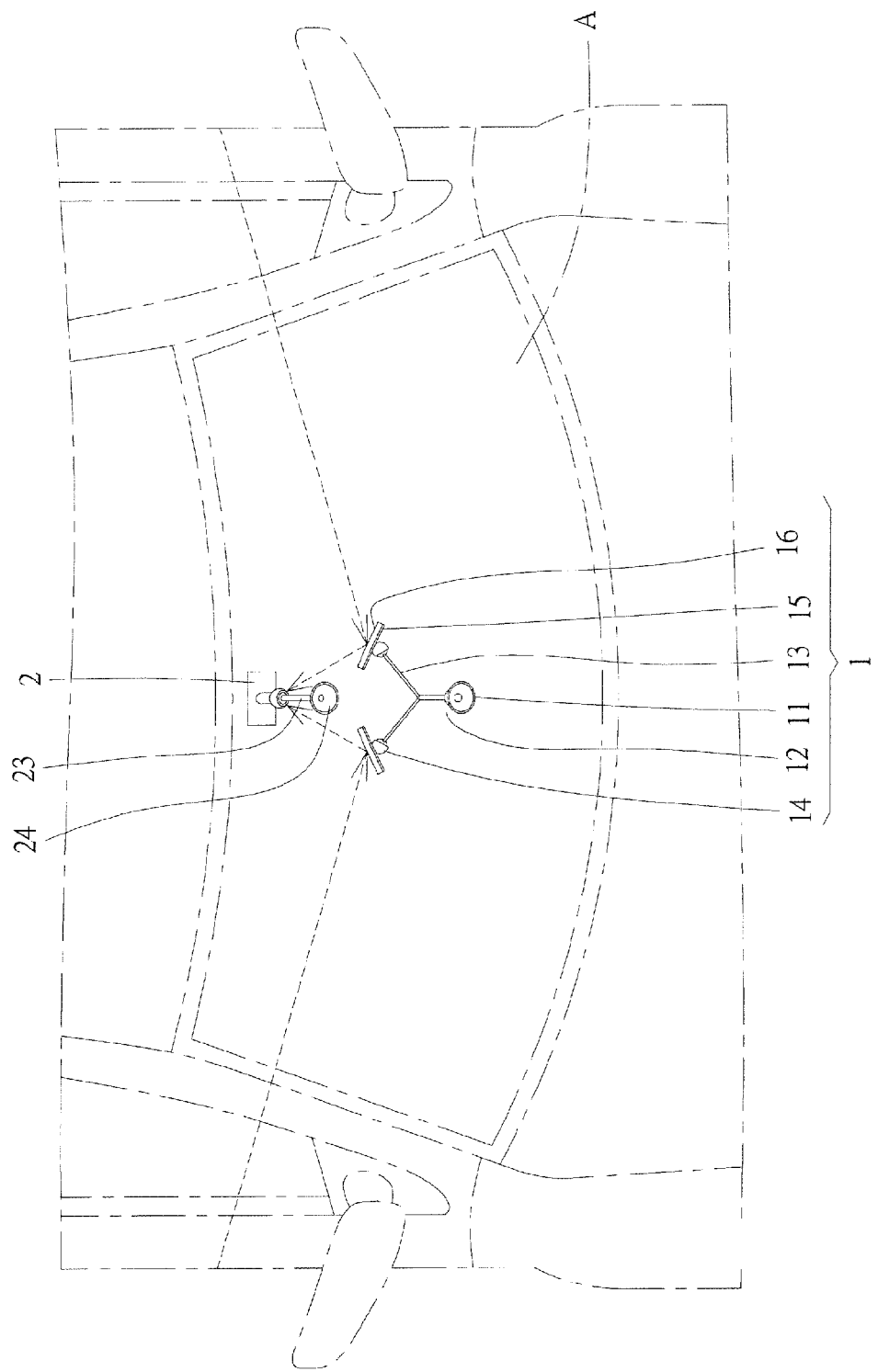
FIG. 3 a top-view diagram showing the event data recorder of FIG. 1 from above a vehicle.
Figure 4:
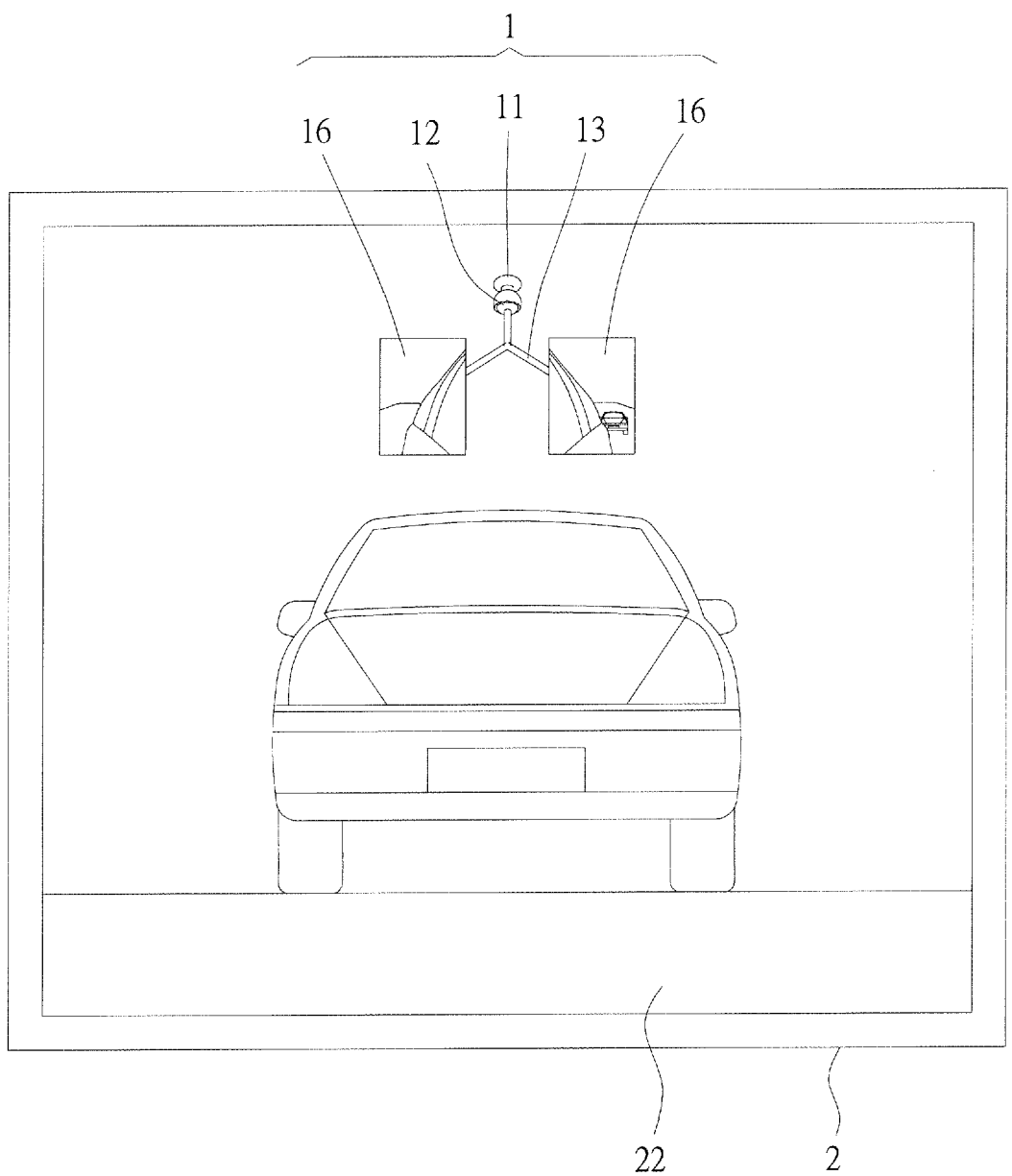
FIG. 4 is a schematic diagram showing an image captured by a camera and displayed on a screen of the event data recorder of FIG. 1.
Figure 5:
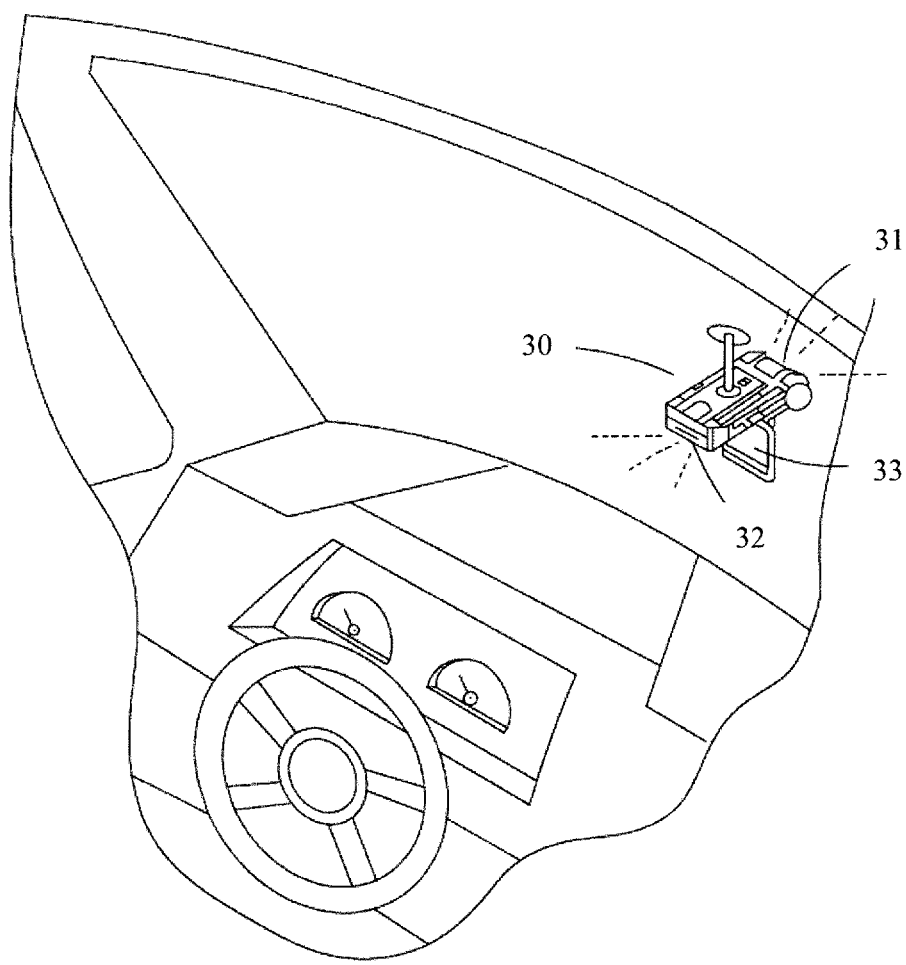
FIG. 5 shows a conventional event data recorder installed inside a vehicle.

As shown in FIGS. 2 and 3, an installation scenario of the event data recorder is as follows. Firstly, the first fixation element 11 is attached to an appropriate location inside the front windshield A and the first connection element 13 is arranged through the first ball joint 12 so that the first connection element 13 is at an appropriate height or orientation relative to the first fixation element 11. Then, through the second ball joints 14, the mirror bases 15 are arranged so that the curved mirrors 16 can properly reflect images outside the lateral sides of the vehicle. The second fixation element 24 of the camera member 2 is then also attached to an appropriate location inside the front windshield A so that the camera 21 can record images outside the windshield A and images reflected on the mirrors 16. As such, with a single camera, the event data recorder is able to record views in front of the vehicle and views to the lateral sides of the vehicle. FIG. 4 is a schematic diagram showing an image captured by the camera 21 and displayed on the screen 22.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An event data recorder for a vehicle, comprising:
 a mirror set comprising a first fixation element, a first connection element, two mirror bases, and two curved mirrors where the first fixation element is configured to an end of the first connection element, each mirror base is configured to a second end of the first connection element oppositely to the first end, and each curved mirror is mounted on a mirror base, bulging away from the mirror base, for capturing an outside view to a lateral side of the vehicle; and
 a camera member comprising a second fixation element, a second connection element, and a camera where the second fixation element is configured to a first end of the second connection element and the camera is configured to a second end of the second connection element oppositely to the first end of the second connection element for capturing views in front of the vehicle and reflected from the curved mirrors.

2. The event data recorder according to claim 1, wherein the first connection element is Y-shaped.

3. The event data recorder according to claim 1, wherein the first fixation element is one of a suction cup, an adhesive base, and a clamp.

4. The event data recorder according to claim 1, wherein the second fixation element is one of a suction cup, an adhesive base, and a clamp.

5. The event data recorder according to claim 1, wherein the first fixation element is rotatably joined to the first connection element through a first ball joint.

6. The event data recorder according to claim 1, wherein each mirror base is rotatably joined to the first connection element through a second ball joint.

* * * * *